F. W. WORSTELL.
Potato-Planters.

No. 140,178.

2 Sheets--Sheet 1.

Patented June 24, 1873.

WITNESSES:
Charles Meisner
J. W. Herthel

INVENTOR:
Fredrick W. Worstell
per. Herthel & Co
Attys.

F. W. WORSTELL.
Potato-Planters.

No. 140,178. Patented June 24, 1873.

WITNESSES:
Charles Meisner
John M. Herthel

INVENTOR:
Frederick W. Worstell
per. Herthel & Co
Attys.

UNITED STATES PATENT OFFICE.

FREDERICK W. WORSTELL, OF ST. LOUIS, MISSOURI.

IMPROVEMENT IN POTATO-PLANTERS.

Specification forming part of Letters Patent No. 140,178, dated June 24, 1873; application filed November 15, 1872.

*To all whom it may concern:*

Be it known that I, FREDERICK W. WORSTELL, of St. Louis, in the county of St. Louis and State of Missouri, have made a certain new and useful Improved Potato-Planter; and I do hereby declare that the following is a full and true description thereof, reference being had to the accompanying drawings and to the letters of reference marked thereon.

The object of this invention is chiefly the formation of a potato-planter in which the several operations—viz., of cutting the larger sizes of potatoes, dropping, feeding, and planting the cut as well as uncut potatoes, creating its furrows, and covering the planted seed—are all accomplished at the same time, and with less manual labor, expense, and inconvenience than incurred from the ordinary method of planting potatoes. The nature of this invention consists, first, in the combination and construction of parts constituting the cutting apparatus so as to be operated by the driving-wheels, and by means whereof the larger sizes of potatoes can be cut, and the cut as well as whole potatoes dropped into the seeding apparatus; second, in the peculiar combination, construction, and operation of the seeding apparatus, consisting of feed-boxes attached to endless belts, and which are operated by shafting and gearing from the power of the driving-wheels.

To enable those herein skilled to make and use my said improvements, I will now more fully describe the same, referring to—

Figure 1:
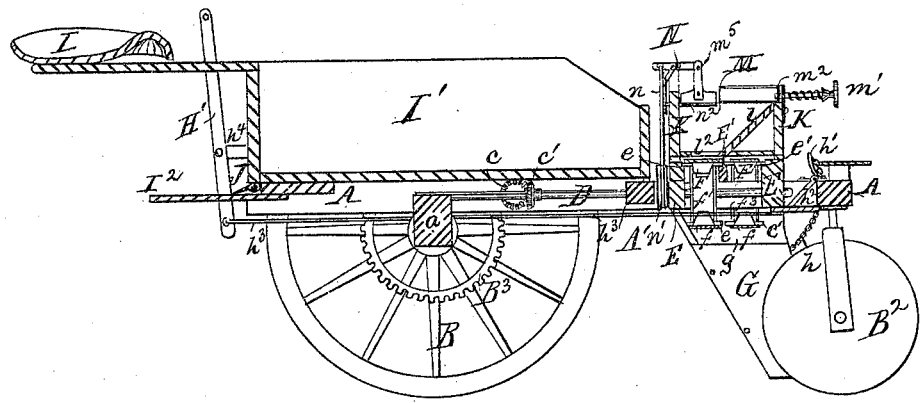
Figure 2:
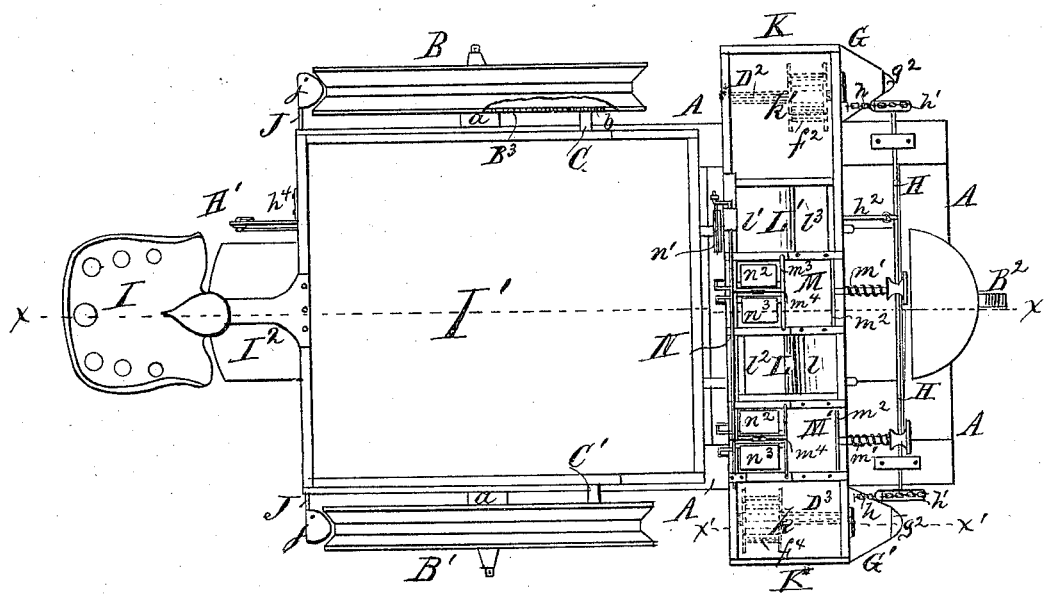
Figure 3:
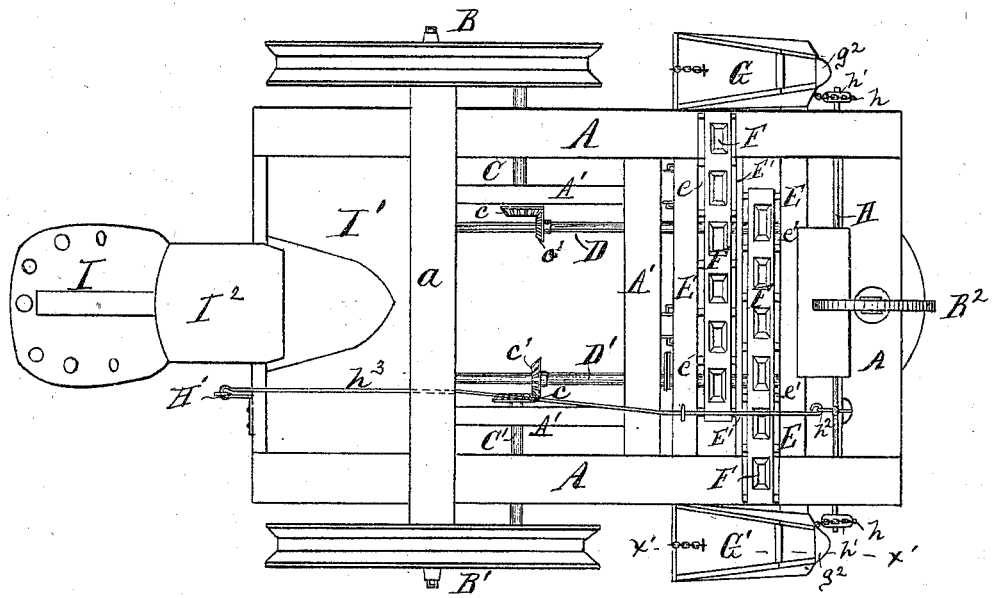
Figure 4:
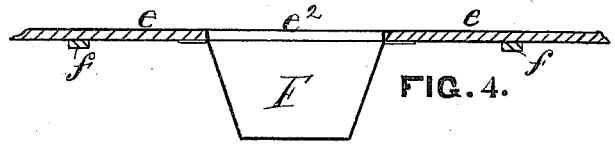
Figure 5:
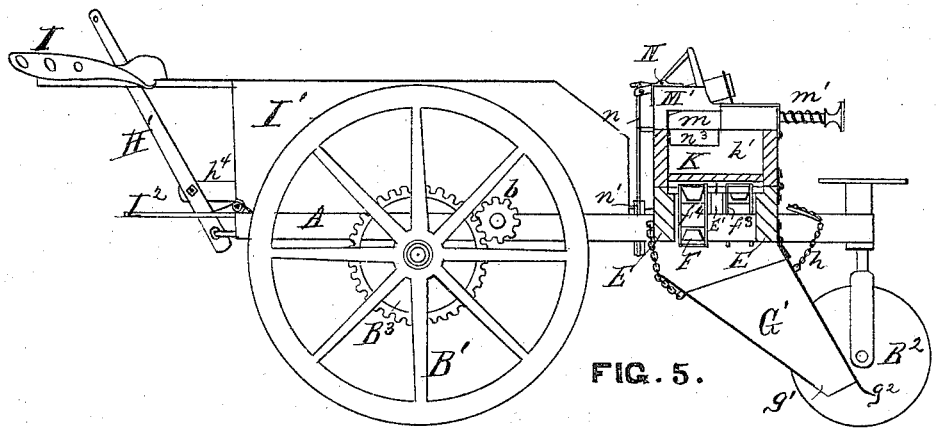

Figure 1, Sheet 1, as a sectional elevation, at line $x\ x$ of Fig. 2; to Fig. 2, Sheet 1, as a top plan; to Fig. 3, Sheet 2, as a bottom plan, to Fig. 4, Sheet 2, as an enlarged detail section of endless belt, carrying feed-boxes; to Fig. 5, Sheet 3, as a side elevation, showing sections through parts with line $x'\ x'$ of Fig. 3 or 2.

A represents a properly constructed horizontal main frame. The frame A is supported by a transverse axle, $a$, to which are secured driving-wheels B B$^1$. A$'$ is a supplemental frame secured within main frame and to axle to support the gearing and shafting. (See Fig. 3.) The driving-wheels B B$^1$ are formed with a concave surface for the purpose of covering the furrows. The front of the machine is sustained by a caster-wheel, B$^3$, which enables the machine to be turned readily in any direction. The wheels B B$^1$ are provided with driving-gear wheels B$^3$, in which mesh the respective pinions $b$. (See Figs. 2 and 5.) The pinions $b$ are keyed to the end of the short shafts C C$'$. (See Figs. 2 and 5.) The shafts C C$'$ are transversely arranged, operating in proper journal-boxes secured to the frames A A$'$. To the opposite end of each shaft C C$'$ is keyed a bevel-wheel, $c$, meshing with a bevel-wheel, $c'$, the latter being secured to the respective longitudinal shafts D D$^1$. (See Figs. 1 and 3.) The shafts D D$^1$ extend from the axle through the frame-work near to the front of machine, the journals of said shafting operating in proper journal-boxes. From the driving-wheels the rotary motion achieved is thus imparted to the shafting and gearing described, which further operate the seed-distributing apparatus. The seeding apparatus is arranged to operate within a rectangular frame, E, properly secured transversely to top and within main frame A. The seeding apparatus consists of endless belts $e\ e^1$, to which are relatively attached feed-boxes F, into which the seed drops through apertures $e^2$. (See Figs. 1, 3, 4, and 5.) To the belts $e\ e^1$ are further secured cross-slats $f$, (Fig. 4,) fitted to engage and be retained in the side notches, with which the disks of the open wheels are provided, and around which said beltings pass. Therefore, one part of the belting $e$ is arranged to pass round with an open wheel, $f^1$, which is secured to the shaft D, (Fig. 1,) the opposite part of said belt similarly passing round with an open wheel, $f^2$, which is secured to shaft D$^2$, arranged to turn in one side of the frame E. (See dotted lines, Fig. 2.) Similarly, the belting $e^1$ has one part thereof arranged to pass round with an open wheel, $f^3$, secured to shaft D$^1$, (Fig. 1,) the other part of said belt passing round with an open wheel, $f^4$, which is similarly secured to a shaft, D$^3$, shown in dotted lines, Fig. 2, also Fig. 5, and operating in the opposite side of the rectangular frame E. The respective wheels $f^1\ f^2$ $f^3 f^4$ are formed with enlarged side disks, to allow free rotary passage of the feed-boxes F. In order to retain the endless belts $e\ e^1$ in operative position, the same by their cross-slats F slide on the frame E, which, for this purpose, has its upper side edges beveled. (Shown in Fig. 1.) Also, between the belts is arranged a partition-slide, E', for the same purpose. The said beltings are thus facilitated in their slide motion, and guided and prevented from lateral play.

It will be noticed that the belts are arranged to operate reversely, that of $e$ being operated from the power-source of the driving-wheel B, that of $e^1$ being operated by the wheel $B^1$. The seed or potato dropped in the feed-boxes F, being fed by the operation of the beltings in line with the seed-boxes, is thus dropped through same in line with the furrow. Hence, G G' are seed-boxes of ordinary construction, and properly hinged and secured by chain attachments to the bottom of the frame E. At the inner side top of each seed-box is left an open space, $g$, (Fig. 1,) for the through passage of the endless belts. At the bottom said seed-boxes have inclined open passages $g^1$, Fig. 5, to allow for free passage of the soil, and prevent clogging. $g^2$ are furrowers, as usual, attached to bottom front of each seed-box.

The seed-boxes being hinged the furrowers $g^2$ can be gaged as to depth by the driver as follows: A chain, $h$, connects each seed-box to an arm, $h^1$, (formed to take up slack,) which forms part of a shaft, H, operating in proper journal-boxes at top of main frame A. Further, the shaft H connects, by an arm, $h^2$, to a connecting-rod, $h^3$, which extends along bottom of machine through axle to the rear, connecting with the lower end of a hand-lever, H'. The hand-lever H' has its fulcrum in a bracket, $h^4$, secured to frame A, and so as to bring the lever in operative reach of the driver. I is the driver's seat; $I^1$, wagon-bed secured to top of main frame A. $I^2$ are foot-boards. The required depth for the furrowers is thus readily achieved, and otherwise the operator can regulate the action of the seed-boxes and furrowers to clear obstacles and follow the rows or furrows for planting. To the rear of machine and properly turning in bearings is a treadle-shaft, J. At its ends are scrapers $j$, formed to engage the concave surface of the wheels B $B^1$.

The shaft J is operated by foot-power, so that its scrapers engage the surface of the wheels to clean same from soil.

The seeding apparatus described is further provided with a cutting and hopper attachment, as follows: To the top of the rectangular frame E, and properly hinged to one side thereof, is secured a rectangular-shaped box, K. The box K is divided to form the separate end compartments $k\ k'$, forming receptacles for the potatoes to be cut as well as planted. Between the side compartments $k\ k'$ are hoppers L L', formed with opposite slanting sides $l\ l^1$ leading to apertures $l^2\ l^3$, which are in bottom of the box K, and so arranged that one of said apertures shall be in line with each belting $e\ e^1$. (See Figs. 1 and 2.) On top of the box K are further secured boxes M M', formed with wooden sides, but metal bottoms; that of M' being arranged to one side, that of M dividing the feed-hoppers L L'. (See Fig. 2.) The sides of the boxes are left open at $m$, (Fig. 5,) to allow the potato cut to drop through into the hoppers L L', or into the side receptacle, as in case of M', to be recut.

The potatoes to be planted, if of proper size, are dropped into the box M, in which they are fed forward by means of the hand-shaft $m^1$, carrying at its inner end a slide, $m^2$, as shown in Figs. 1 and 2. If the potatoes, however, are of large size they are first cut, once or twice, as may be necessary, in the box M', after which they are placed in box M.

The cutters can consist of a transverse cutter, $m^3$, and horizontal cutter $m^4$, both arranged to operate in one of the boxes M, or simply a horizontal cutter, $m^4$, can be used, as shown in box M', Fig. 2. The transverse cutter $m^3$ is secured to form part of the horizontal cutter $m^4$, and both are properly guided in their vertical movements by operating in mortises in the sides of their boxes.

To operate the respective cutters their standards $m^5$ connect by arms to a transverse top shaft, N, which is properly secured to turn in raised bearings on one side of the box K, Figs. 1, 2, and 5. Further, the shaft N has its crank connecting with a rod, $n$, and this, in turn, is fitted to a crank-disk, $n^1$, which is eccentrically secured to the shaft D, as indicated in Figs. 1, 2, 3, and 5. From the power source of the driving-wheel B, which operates the shaft D, there is, therefore, imparted to the top shaft N, by means of the crank-disk attachment, a vertical reciprocating motion, which is communicated to the cutters $m^3\ m^4$.

In order at the same time that the potatoes cut can be dropped into the hoppers L L', there is further connected to top shaft N arms and proper connecting-rods, which operate respective crank-shafts arranged to turn in the bottom of each cutter-box M M'.

To the crank-shafts just stated the respective bottom plates $n^2\ n^3$ are secured, so as to turn with their shafts—viz., to open and close a part of the bottom of the cutter-boxes M M'.

When said bottom plates are closed, the cut potatoes are retained in their boxes; when operated to open, said seed is dropped into the hoppers; from thence into seeding apparatus; and finally distributed in the furrows.

The cutter attachment M' cuts the seed in half, being, if necessary, recut into quarters by the cutter attachment M.

Having thus fully described my said improvements, what I claim is—

1. The combination of the boxes K, compartments $k\ k'$, hoppers L L', apertures $l^2\ l^3$, boxes M M', arranged as herein shown and described, for the purpose set forth.

2. The combination of the boxes M M', bottom plates $n^2\ n^3$, cutters $m^3\ m^4$, top shaft N, rod $n$, crank-disk $n^1$, self-acting hand-shaft $m^1$, arranged to operate as herein shown and described, and for the purpose set forth.

In testimony of said invention I have hereunto set my hand.

FRED. W. WORSTELL.

Witnesses:
WILLIAM W. HERTHEL,
CHARLES MEISNER.